US010557574B2

(12) United States Patent
Tomio et al.

(10) Patent No.: US 10,557,574 B2
(45) Date of Patent: Feb. 11, 2020

(54) NI—CR ALLOY MATERIAL AND SEAMLESS OIL COUNTRY TUBULAR GOODS USING THE SAME

(71) Applicant: NIPPON STEEL & SUMITOMO METAL CORPORATION, Tokyo (JP)

(72) Inventors: Yusaku Tomio, Tokyo (JP); Masayuki Sagara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 570 days.

(21) Appl. No.: 15/033,930

(22) PCT Filed: Nov. 11, 2014

(86) PCT No.: PCT/JP2014/079868
§ 371 (c)(1),
(2) Date: May 3, 2016

(87) PCT Pub. No.: WO2015/072458
PCT Pub. Date: May 21, 2015

(65) Prior Publication Data
US 2016/0265694 A1   Sep. 15, 2016

(30) Foreign Application Priority Data

Nov. 12, 2013 (JP) ................. 2013-234035

(51) Int. Cl.
*C22F 1/10* (2006.01)
*F16L 9/02* (2006.01)
*C22C 19/05* (2006.01)

(52) U.S. Cl.
CPC .............. *F16L 9/02* (2013.01); *C22C 19/055* (2013.01); *C22F 1/10* (2013.01)

(58) Field of Classification Search
CPC ................................. C22C 19/055; C22F 1/10
(Continued)

(56) References Cited

U.S. PATENT DOCUMENTS 4,400,210 A   8/1983   Kudo et al.
4,400,211 A   8/1983   Kudo et al.
(Continued)

FOREIGN PATENT DOCUMENTS

CA   2711748   7/2009
CN   1974816   6/2007
(Continued)

OTHER PUBLICATIONS

NPL-1: Takasawa et al, Absorption of Hydrogen in high-strength low-alloy steel during tensile deformation in gaseous hydrogen, ISIJ international, vol. 50(2010), No. 10, pp. 1496-1502 (Year: 2010).*
(Continued)

*Primary Examiner* — Jie Yang
(74) *Attorney, Agent, or Firm* — Clark & Brody

(57) ABSTRACT

A Ni—Cr alloy material has a chemical composition that consists of; Si: 0.01 to 0.5%, Mn: 0.01 to less than 1.0%, Cu: 0.01 to less than 1.0%, Ni: 48 to less than 55%, Cr: 22 to 28%, Mo: 5.6 to less than 7.0%, N: 0.04 to 0.16%, sol.Al: 0.03 to 0.20%, REM: 0.01 to 0.074%, W: 0% or more and less than 8.0%, Co: 0 to 2.0%; one or more of Ca and Mg: 0.0003 to 0.01% in total, and one or more of Ti, Nb, Zr, and V: 0 to 0.5% in total, the balance thereof being Fe and impurities. The impurities include C £ 0.03%, P £ 0.03%, S £ 0.001%, and O £ 0.01%. The dislocation density r of the Ni—Cr alloy material expressed in $m^{-2}$ satisfies a formula $[7.0'10^{15} £ r £ 2.7'10^{16} - 2.67'10^{17}'REM]$.

16 Claims, 1 Drawing Sheet

(58) Field of Classification Search
USPC .......................................................... 148/426
See application file for complete search history.

(56) References Cited

U.S. PATENT DOCUMENTS

| | | |
|---|---|---|
| 4,421,571 A | 12/1983 | Kudo et al. |
| 4,652,315 A | 3/1987 | Igarashi et al. |
| 2007/0181225 A1 | 8/2007 | Igarashi et al. |
| 2010/0170320 A1 | 7/2010 | Sagara et al. |

FOREIGN PATENT DOCUMENTS

| | | |
|---|---|---|
| CN | 102027145 | 4/2011 |
| CN | 102187003 | 9/2011 |
| EP | 1 777 313 | 4/2007 |
| JP | 57-203735 | 12/1982 |
| JP | 57-203736 | 12/1982 |
| JP | 57-207149 | 12/1982 |
| JP | 58-006928 | 1/1983 |
| JP | 58-210155 | 12/1983 |
| JP | 63-274743 | 11/1988 |
| JP | 01-262048 | 10/1989 |
| JP | 11-302801 | 11/1999 |
| JP | 2005-509751 | 4/2005 |
| JP | 2009-084668 | 4/2009 |
| JP | 44-75429 | 6/2010 |
| RU | 2124065 | 12/1998 |
| RU | 2125110 | 1/1999 |
| WO | 2006/003954 | 1/2006 |

OTHER PUBLICATIONS

Nakashima et al., "Estimation of Dislocation Density by X-ray Diffraction method", Current Advances in Materials and Processes, vol. 17, No. 3, 2004.

Williamson et al., "X-ray Line Broadening from Filed Aluminum and Wolfram", Acta Metallurgica, vol. 1, Jan. 1953.

Rietveld, "A Profile Refinement Method for Nuclear and Magnetic Structures", Journal of Applied Crystallography, 1969, 2, 65.

\* cited by examiner

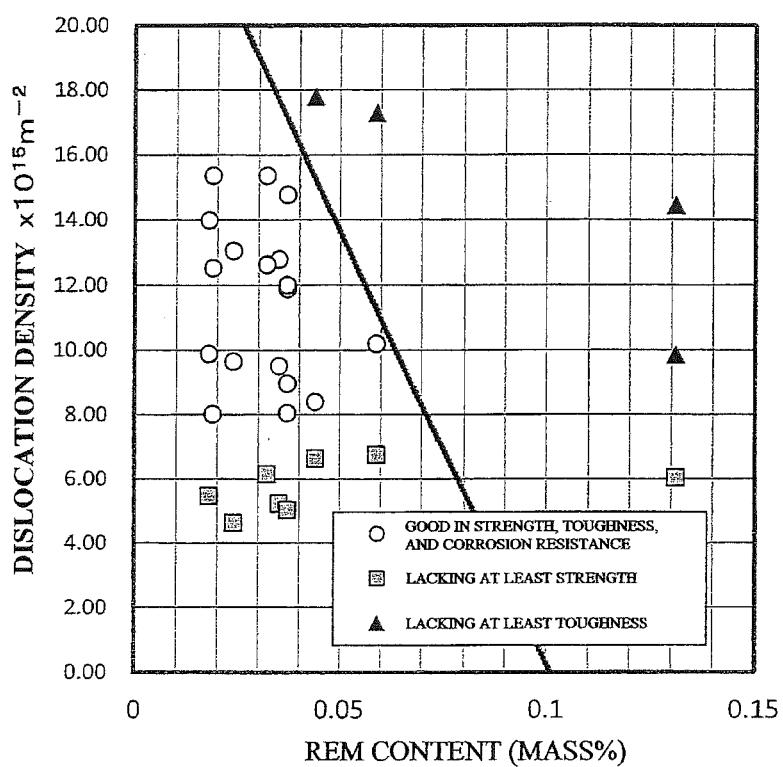

US 10,557,574 B2

NI—CR ALLOY MATERIAL AND SEAMLESS OIL COUNTRY TUBULAR GOODS USING THE SAME

TECHNICAL FIELD

The present invention relates to a Ni—Cr alloy material and seamless oil country tubular goods using the same material. In particular, the present invention relates to a high-strength Ni—Cr alloy material that is excellent in hot workability and shock resistance property, and also excellent in corrosion resistance (especially, stress corrosion cracking resistance in an environment being at high temperatures more than 200° C. and including a large amount of hydrogen sulfide), and seamless oil country tubular goods using the high-strength Ni—Cr alloy material.

The term "high-strength" herein refers to having yield strength (0.2% offset yield stress) of 965 MPa (140 ksi) or more. Note that the term "oil country tubular goods" is a general term for casing, tubing, and drill pipes that are used for drilling an oil well or a gas well to collect crude oil, natural gas or the like, as described in the column of definition in the number 3514 "steel pipe for oil well casing, tubing and drilling" of JIS G 0203 (2009), for example. The term "seamless oil country tubular goods" is a seamless tube that can be used for, for example, drilling an oil well or a gas well to collect crude oil, natural gas or the like.

BACKGROUND ART

With a rise in the price of crude oil in recent years, the developments of oil and natural gas wells at greater depths and in more corrosive environments have been underway. For drilling for oil and natural gas in such harsh environments, oil country tubular goods have been required to have high-strength and an excellent corrosion resistance.

Oil and natural gas contain corrosive substances such as carbon dioxide ($CO_2$), hydrogen sulfide ($H_2S$), and chloride ions ($Cl^-$). For this reason, materials for oil country tubular goods used for drilling for oil or natural gas are required to have an excellent corrosion resistance against these corrosive substances. Especially under environments being at high temperatures of 150° C. or more and including hydrogen sulfide at 1 atm or more, a main cause of corroding oil country tubular goods is stress corrosion cracking. Therefore, materials for oil country tubular goods used in such environments are required to have an excellent stress corrosion cracking resistances.

Furthermore, the growing demand of oil and natural gas has brought oil and gas wells at greater depths and higher temperatures. Materials for oil country tubular goods used in such wells are required to withstand a corrosion environment containing carbon dioxide, hydrogen sulfide and chloride ions, and to have high-strength at the same time. For this reason, in recent years, there has been a greater demand for high-strength oil country tubular goods having a high yield strength (0.2% offset yield stress) of 965 MPa or more.

The use of Ni—Cr alloy materials such as those disclosed in Patent Document 1 to 3 have been attempted in the above harsh corrosive environments, where low alloyed steels, such as martensitic stainless steels, or duplex stainless steels cannot be applied.

For example, in the alloy for oil country tubular goods in Patent Document 1, contents of Ni and Cr are adjusted within specific ranges, and a value of Cr (%)+10Mo (%)+5W (%) and a value of Mo (%)+(½)W (%) are adjusted within specific ranges. Patent Document 1 discloses that the above alloy can ensure the stress corrosion cracking resistance in a "$H_2S$—$CO_2$—$Cl^-$" environment as long as the temperature of the environment is 150° C. or less even if it is a cold worked material. In addition, Patent Document 1 discloses that it is possible to achieve a 0.2% yield stress of 965 MPa or more by adjusting N concentration within a range of 0.05 to 0.30% by mass %, and performing cold working after solution treatment.

In the alloy for oil country tubular goods in Patent Document 2, contents of Ni and Cr are adjusted within specific ranges, and a value of Cr (%)+10Mo (%)+5W (%) and a value of Mo (%)+(½)W (%) are adjusted within specific ranges. Patent Document 2 discloses that the above alloy can ensure the stress corrosion cracking resistance in a "$H_2S$—$CO_2$—$Cl^-$" environment having an extremely excellent corrosion property, in particular in an adverse environment at 150° C. or less, even if it is a cold worked material. In addition, Patent Document 2 discloses that it is possible to achieve a 0.2% yield stress of 965 MPa or more by making N contained within a range of 0.05 to 0.25% by mass %, and performing both cold working and aging treatment after solution treatment.

In the alloy for oil country tubular goods in Patent Document 3, contents of Mn, Ni, and Cr are adjusted within specific ranges, and a value of (½) Mn (%)+Ni (%), a value of Cr (%)+Mo (%)+(½)W (%), and a value of Mo (%)+(½)W (%) are adjusted within specific ranges. Patent Document 3 discloses that the above alloy can ensure the stress corrosion cracking resistance in a "$H_2S$—$CO_2$—$Cl^-$" environment having an extremely strong corrosive properties, in particular, an adverse environment at 150° C. or less, even if it is a cold worked material. In addition, Patent Document 3 discloses that it is possible to achieve a 0.2% yield stress of about 940 MPa by making N contained within a range of 0.1 to 0.4% by mass %, and performing cold working after solution treatment.

Note that, strengthening by increasing the N content as in Patent Document 1 to 3 described above is prone to cause a problem of reducing hot workability of the alloy. For this reason, Patent Document 1 to 3 disclose a technique to improve hot workability by reducing a content of S to 0.0007% or less by mass %, or by making Ca, Mg, Ti, or the rare-earth metal elements (hereafter, referred to as "REM") contained.

In the high Cr-high Ni alloy material in Patent Document 4, contents of Cu, Ni, and Cr are adjusted within specific ranges, and a value of $Cu+0.4(Mo-1.4)^2$ is adjusted within a specific range. Patent Document 4 discloses that the above alloy can ensure the good stress corrosion cracking resistance in a corrosive "$H_2S$—$CO_2$—$Cl^-$" environment even when it is subjected to 25% cold working to bring the 0.2% yield stress of the alloy to a strength level of 861 to 964 MPa (87.75 to 98.28 $kgf/mm^2$), so-called "125 ksi-class".

Note that Patent Document 4 also discloses a technique to improve the hot workability by reducing a content of S to 0.0007% or less by mass %, or by making Ca, Mg, REM contained.

In addition, Patent Document 5 discloses a super austenitic stainless steel having an excellent corrosion resistance in an acid environment and a seawater environment, and it is also excellent in the hot workability by adjusting contents of Cr, Ni, Mo, Mn, and N within specific ranges and making elements such as Mg, Ca, and Ce contained.

In the Cr—Ni alloy material in Patent Document 6, contents of Cu, Ni, Cr, Mo, N, Al, and REM are adjusted within specific ranges, and a value of N (%)×P (%)/REM (%) is adjusted within a specific range. Patent Document 6 discloses that the above alloy material can ensure the good hot workability, and ensure the good stress corrosion cracking resistance in a corrosive environment including $H_2S$, $Cl^-$, and the like at a temperature of 177° C. by performing cold rolling of 40% reduction of area to provide a high 0.2% yield stress of 941 to 1176 MPa.

Patent Document 7 discloses a producing method for a stainless steel in which contents of Cr, Ni, Si, Mn, C, N, Mo, S, B, P, and O are adjusted within specific ranges. Patent Document 7 describes that the above stainless steel is excellent in strength and the stress corrosion cracking resistance.

Patent Document 8 discloses an austenitic alloy in which contents of C, Si, Mn, Cr, Ni, Mo, La, Al, Ca, O, P, and S are adjusted within specific ranges. Patent Document 8 describes that the above austenitic alloy has a good crack resistance in an environment including hydrogen sulfide.

LIST OF PRIOR ART DOCUMENTS

Patent Document

Patent Document 1: JP57-203735A
Patent Document 2: JP57-207149A
Patent Document 3: JP58-210155A
Patent Document 4: JP11-302801A
Patent Document 5: JP2005-509751A
Patent Document 6: JP2009-84668A
Patent Document 7: JP1-262048A
Patent Document 8: JP63-274743A Non Patent Document Non-Patent Document 1: Koichi Nakashima et al.: CAMP-ISIJ, 17 (2004), 396
Non-Patent Document 2: G. K. Williamson and W. H. Hall: Acta Metall., 1 (1953), 22
Non-Patent Document 3: H. M. Rietveld: J. Appl. Cryst., 2 (1969), 65

DISCLOSURE OF THE INVENTION

Problems to be Solved by the Invention

By using the alloys disclosed in Patent Documents 1 and 2 described above, it is possible even with a 0.2% yield stress of 965 MPa or more to ensure the good stress corrosion cracking resistance in the corrosive environment including hydrogen sulfide as long as the temperature of the environment is at 150° C. or less.

In addition, by using the alloy disclosed in Patent Document 3 mentioned above, it is possible with a 0.2% yield stress of about 940 MPa to ensure the good stress corrosion cracking resistance even in a corrosive environment including hydrogen sulfide when the temperature of the environment is 150° C. or less.

Furthermore, by using the alloy disclosed in Patent Document 4 mentioned above, it is certainly possible to ensure the good stress corrosion cracking resistance even in a corrosive environment including hydrogen sulfide when the 0.2% yield stress of the alloy is at a strength level of 861 to 964 MPa, so-called "125 ksi-class". Moreover, when a content of Mo is 1.5% or less by mass %, it is possible to considerably improve the hot workability of the alloy, which enables Mannesmann pipe making process, when applied, to create a finished pipe without any problems.

Similarly, by using the alloy disclosed in Patent Document 6 mentioned above, it is certainly possible even with a high 0.2% yield stress of 965 MPa or more to ensure the good stress corrosion cracking resistance even in a corrosive environment including hydrogen sulfide, as long as the temperature of the environment is 177° C. or less.

However, even with the alloy proposed in Patent Documents 1 to 4 and Patent Document 6, the fact is that when cold working is performed to increase a 0.2% yield stress to 965 MPa or more, it is still difficult to ensure the good stress corrosion cracking resistance in a corrosive environment including hydrogen sulfide at a high temperature region more than 200° C.

Furthermore, even an austenite-based Ni—Cr alloy degrades its toughness (shock resistance property) inevitably when cold working is performed to increase the 0.2% yield stress to 965 MPa or more. For this reason, there is a possibility that a product is broken during transportation or in use.

Note that in the case of the alloy proposed in Patent Document 3, the content of P is limited to 0.030% or less by mass %, which is for avoiding co-segregation of Mn with P. However, since Mn is contained as much as 3.0 to 15.0% by mass %, it may be difficult to avoid the co-segregation of Mn with P even if the content of P is limited to 0.030% or less. Then, the co-segregation of Mn with P leads to the reduction of toughness, which may cause, for example, a trouble in transportation of a product as mentioned above when high cold working is performed to obtain a high strength.

In addition, the alloy proposed in Patent Document 5 has a problem that performing cold working with a high reduction rate to obtain a high strength invokes the reductions of ductility and toughness. Furthermore, although the above alloy contains Mn at 1.0 to 6.0%, preferably 2.0 to 6.0%, more preferably 3.0 to 6.0%, and very preferably 4.0 to 6.0% by mass %, there is no consideration about the content of P at all. For this reason, it is difficult to avoid a considerable reduction of toughness due to the co-segregation of Mn with P even by a low level of cold working. In addition, the alloy in Patent Document 5 is not an alloy stably ensuring the good stress corrosion cracking resistance in a corrosive environment including hydrogen sulfide and in a high temperature region more than 200° C., in particular when severe cold working is performed to increase the 0.2% yield stress to 965 MPa or more.

In addition, for the stainless steel in Patent Document 7, there is no consideration about cold working. In other words, there is no description in Patent Document 7 about an alloy component with which it is possible to stably ensure the good stress corrosion cracking resistance in a corrosive environment at a high temperature when severe cold working is performed to increase the 0.2% yield stress to 965 MPa or more.

In addition, for the austenite alloy in Patent Document 8, it is necessary to make N contained so as to increase the 02% yield stress to 965 MPa or more, but there is no description in Patent Document 8 about a N content. In addition, Patent Document 8 does not describe an alloy composition that offers a high-strength of 965 MPa or more and exhibits an excellent corrosion resistance in a corrosive environment at a high temperature.

An objective of the present invention, which has been made in a view of the above circumstances, is to provide a Ni—Cr alloy material that enables the prevention of reducing hot workability, corrosion resistance, and toughness with an increase of high strength, and seamless oil country tubular goods using the Ni—Cr alloy material. In particular, an objective of the present invention is to provide a high-strength Ni—Cr alloy material that is excellent in hot workability and toughness, also excellent in corrosion resistance (more specifically, the stress corrosion cracking resistance in an environment being at high temperatures more than 200° C. and including hydrogen sulfide), and has a yield strength (0.2% yield stress) of 965 MPa or more, and to provide seamless oil country tubular goods using the high-strength Ni—Cr alloy material.

Means for Solving the Problems

To solve the above problems, the present inventors first conducted basic studies about the improvement of yield strength (0.2% yield stress) using Ni—Cr alloy materials, based on the Ni—Cr alloy materials having been proposed so far, with the chemical composition thereof adjusted in various manners. As a result, the following points (a) to (e) were found.

(a) Effective means for increasing a yield strength of a Ni—Cr alloy material are to raise a cold working rate to increase a dislocation density of the alloy material, or to increase a N content of the alloy material, especially the N content in a solid solution state.

(b) In contrast, making N contained in a large amount results in the reduction of not only toughness but also hot workability. For this reason, for example, it is difficult to avoid the occurrence of a lot of defects in working a product such as pipe-making. In addition, making N contained in a large amount may cause a Cr nitride to remain in a microstructure even after solution treatment. In this case, corrosion resistance at a high temperature and high-pressure hydrogen sulfide environment is considerably reduced.

(c) To inhibit the reduction of hot workability, it is effective to prevent segregation of S in grain boundaries, which occurs at about 900° C.

(d) Toughness of an alloy material is reduced also by an increase in dislocation density through cold working.

(e) In the case of a Ni—Cr alloy material not containing nitrogen, which has been proposed, increasing a cold working rate to bring the 0.2% yield stress to 965 MPa or more disables ensuring the stress corrosion cracking resistance in an environment including hydrogen sulfide at 200° C.

Next, the present inventors conducted various researches to inhibit in particular the reduction in hot workability within a low-temperature region in a nitrogen-contained material, and the degradation in toughness when the cold working rate is increased for a high strength. As a result, the present inventors obtained the following findings (f) to (h).

(f) Only by conventional desulfurization using Ca and/or Mg, it is difficult to stably inhibit the reduction of hot workability in a low-temperature region. In contrast, REM has a desulfurizing effect equivalent to or more than Ca or Mg, but prone to be oxidized. Therefore, REM alone contained as an element for desulfurization does not result in a sufficient desulfurizing effect, and it is difficult to stably inhibit the reduction of hot workability in a low-temperature region.

(g) By making REM contained in combination with Ca and/or Mg to perform desulfurization, it is possible to stably inhibit the reduction of hot workability in a low-temperature region.

(h) Note that addition of REM increases the amount of inclusions, which makes the toughness degradation of the alloy material conspicuous when the cold working rate is increased for a high strength.

Thus, the present inventors conducted researches in further details. As a result, an important fact described in the following (i) was discovered.

(i) When the N content is adjusted within specific ranges, and REM is contained in combination with Ca and/or Mg, it is possible to stably inhibit the reduction of hot workability in a low-temperature region, and moreover to provide a Ni—Cr alloy that has a high strength, a good toughness and the excellent stress corrosion cracking resistance in a high temperature environment including hydrogen sulfide. Specifically, there is a Ni—Cr alloy that has a 0.2% yield stress of 965 MPa or more, a good toughness (shock resistance property) at a low temperature, which is an impact value of more than 63 J/cm$^2$ at −10° C., and the excellent stress corrosion cracking resistance in an environment at high temperatures more than 200° C. and including hydrogen sulfide. Such an alloy satisfies specified conditions about chemical composition as well as dislocation density.

The present invention has been completed based on the above facts, and the gist thereof is a Ni—Cr alloy material described below and seamless oil country tubular goods using the same.

(1) A Ni—Cr alloy material having a chemical composition that consists of, by mass %:

Si: 0.01 to 0.5%, Mn: 0.01% or more and less than 1.0%, Cu: 0.01% or more and less than 1.0%, Ni: 48% or more and less than 55%, Cr: 22 to 28%, Mo: 5.6% or more and less than 7.0%, N: 0.04 to 0.16%, sol.Al: 0.03 to 0.20%, REM: 0.01 to 0.074%, W: 0% or more and less than 8.0%, Co: 0 to 2.0%, one or more of Ca and Mg: 0.0003 to 0.01% in total, and one or more of Ti, Nb, Zr, and V: 0 to 0.5% in total; and the balance being Fe and impurities, wherein C, P, S, and O in the impurities are C: 0.03% or less, P: 0.03% or less, S: 0.001% or less, and O: 0.01% or less, and furthermore the dislocation density satisfies a following formula:

$$7.0 \times 10^{15} \leq \rho \leq 2.7 \times 10^{16} - 2.67 \times 10^{17} \times [REM (\%)]$$

where $\rho$ denotes dislocation density expressed in m$^{-2}$, and [REM (%)] denotes REM content expressed by mass %.

(2) The Ni—Cr alloy material according to the above (1), containing 0.1% or more and less than 8.0% of W, by mass %.

(3) The Ni—Cr alloy material according to the above (1) or (2), containing 0.01 to 0.5% of one or more of Ti, Nb, Zr, and V in total, by mass %.

(4) The Ni—Cr alloy material according to any one of the above (1) to (3), containing 0.01 to 2.0% of Co, by mass %.

(5) Seamless oil country tubular goods comprising the Ni—Cr alloy material according to any one of the above (1) to (4).

Advantageous Effects of the Invention

The Ni—Cr alloy material according to the present invention is excellent in hot workability and toughness (shock resistance property). In addition, even with a high-strength, a yield strength (0.2% yield stress) of 965 MPa or more, the Ni—Cr alloy material according to the present invention is still excellent in corrosion resistance represented by the stress corrosion cracking resistance, in an environment being at high temperatures more than 200° C. and including hydrogen sulfide. For this reason, the Ni—Cr alloy material according to the present invention can be suitably used for high-strength seamless oil country tubular goods.

BRIEF DESCRIPTION OF THE DRAWINGS

FIG. 1 is a diagram illustrating for alloys used in Example how yield strength and toughness vary as REM content and dislocation density vary, summarizing the results of Table 2. Note that FIG. 1 excludes the results on the alloys Nos. 1 to 6 and Nos. 8 to 13 because, as to alloys Nos. 1 to 5 and Nos. 8 to 13, at least one of elements of these alloys other than REM is out of a range specified in the present invention, and as to an alloy No. 6, evaluation of toughness and the like was not performed due to its deteriorated hot workability in itself. The line in the FIGURE expresses the relationship: $\rho=2.7\times10^{16}-2.67\times10^{17}\times[\text{REM }(\%)]$.

MODE FOR CARRYING OUT THE INVENTION

Hereinafter, each requirement of the invention will be described in detail. Note that "%" of the content of each element represents "mass %".

(A) Chemical Composition

Si: 0.01 to 0.5%

Si (Silicon) is an element necessary for deoxidation, and the Si content is 0.01% or more. The Si content more than 0.5% tends to result in degradation in hot workability. Therefore, the Si content is set at 0.01 to 0.5%. A preferable lower limit of the Si content is 0.05%, and a more preferable lower limit thereof is 0.07%. In addition, a preferable upper limit of the Si content is 0.40%, and a more preferable upper limit thereof is 0.33%.

Mn: 0.01% or more and less than 1.0%

Mn (manganese) is an element necessary for deoxidizing and/or desulfurizing, but the effects thereof do not exhibit sufficiently when the Mn content is less than 0.01%. On the other hand, the Mn content of 1.0% or more results in degradation of hot workability. Therefore, the Mn content is set at 0.01% or more and less than 1.0%. A preferable lower limit of the Mn content is 0.10%, a more preferable lower limit thereof is 0.20, and a still more preferable lower limit is 0.24%. In addition, a preferable upper limit of the Mn content is 0.80%, a more preferable upper limit thereof is 0.70%, and a still more preferable upper limit thereof is 0.66%.

Cu: 0.01% or more and less than 1.0%

Cu (copper) has an effect of stabilizing a passivation film formed on a surface of a Ni—Cr alloy material and is thus necessary to enhance pitting resistance and general corrosion resistance. However, the Cu content less than 0.01% makes the effect insufficient, and the Cu content of 1.0% or more results in degradation of hot workability. For this reason, the Cu content is set at 0.01% or more and less than 1.0%. A preferable lower limit of the Cu content is 0.20%, and a more preferable lower limit thereof is 0.55%. In addition, a preferable upper limit of the Cu content is 0.85%, and a more preferable upper limit thereof is 0.8%.

Ni: 48% or more and less than 55%

Ni (nickel) is contained as an austenite stabilizing element. The Ni content is 48% or more from the viewpoint of corrosion resistance, but the Ni content of 55% or more leads to an increase in costs and degradation of hydrogen cracking resistance. For this reason, the Ni content is set at 48% or more and less than 55%. A preferable lower limit of the Ni content is 49%, and a more preferable lower limit thereof is 49.2%. In addition, a preferable upper limit of the Ni content is 52%, and a more preferable upper limit thereof is 51.1%.

Cr: 22 to 28%

Cr (chromium) is a component that considerably improves the stress corrosion cracking resistance, but the Cr content less than 22% makes the effect thereof insufficient. On the other hand, the Cr content more than 28% leads to degradation in hot workability, and facilitates formation of TCP (topologically closed packed phases) represented by Sigma phase, leading to degradation of the stress corrosion cracking resistance. Therefore, the Cr content is set at 22 to 28%. A preferable lower limit of the Cr content is 23%, and a more preferable lower limit thereof is 23.5%. In addition, a preferable upper limit of the Cr content is 26%, and a more preferable upper limit thereof is 25.7%.

Mo: 5.6% or more and less than 7.0%

Mo (molybdenum) has an effect of, as with Cu, stabilizing a passivation film formed on a surface of a Ni—Cr alloy material and an effect of improving pitting resistance and the stress corrosion cracking resistance. However, the Mo content less than 5.6% makes the effect insufficient. On the other hand, the Mo content of 7.0% or more results in an increase in high temperature strength of austenite and promotes formation of a deleterious phase such as Sigma phase and mu phase during casting the alloy. This degrades hot workability. Furthermore, an excessive Mo content leads to an increase in alloy cost. Therefore, the Mo content is set at 5.6% or more and less than 7.0%. A preferable lower limit of the Mo content is 5.7%, and a more preferable lower limit thereof is 5.8%. In addition, a preferable upper limit of the Mo content is 6.8%, and a more preferable upper limit thereof is 6.7%.

N: 0.04 to 0.16%

N (nitrogen) is an important element in the invention. N functions to increase a strength of a Ni—Cr alloy, but the N content less than 0.04% does not allow for ensuring a desired high-strength and easily leads to an abrupt reduction of the stress corrosion cracking resistance due to an increase in dislocation density. On the other hand, the N content more than 0.16% leads to decrease in the maximum workable temperature in hot working and deterioration of the stress corrosion cracking resistance with precipitation of a chromium nitride. For this reason, the N content is set at 0.04 to 0.16%. A preferable lower limit of the N content is 0.06%, a more preferable lower limit thereof is 0.08%, and a still more preferable lower limit thereof is 0.098%. In addition, a preferable upper limit of the N content is 0.14%, and a more preferable upper limit thereof is 0.125%.

sol.Al: 0.03 to 0.20%

Al (aluminum) has not only an effect of deoxidation to improve hot workability but also an effect of preventing the effect of REM from decreasing due to oxidation. In a Ni—Cr alloy containing REM but containing no Al, a large part of the REM is consumed to be an oxide thereof. This results in an increase of solute S significantly reducing hot workability. Therefore, when containing REM, it is necessary to contain Al together. Note that the Al content less than 0.03% as sol.Al makes the effect insufficient. On the other hand, the Al content more than 0.20% as sol.Al rather leads to degradation in hot workability. Therefore, the Al content is set at 0.03 to 0.20% as sol.Al. A preferable lower limit of the Al content is 0.05% as sol.Al, a more preferable lower limit thereof is 0.07%, and a still more preferable lower limit thereof is 0.076%. In addition, a preferable upper limit of the Al content is 0.18% as sol.Al, a more preferable upper limit thereof is 0.14%, and a still more preferable upper limit thereof is 0.135%. Note that the term "sol.Al" refers to so-called "acid-soluble Al".

REM: 0.01 to 0.074%

REM is an important element in the present invention. REM is contained because of its effect of improving hot workability and the stress corrosion cracking resistance. Note that it is necessary to contain Al together because REM is easy to oxidize. Making an alloy containing REM in combination with Ca and/or Mg stably inhibits degradation in hot workability in a low-temperature region and provides the alloy with high-strength, good toughness at a low temperature range, and the stress corrosion cracking resistance in a high temperature environment that includes hydrogen sulfide. However, the REM content less than 0.01% makes the above effects insufficient, and result in degradation in stress corrosion cracking resistance due to the high-strength. In contrast, the REM content more than 0.074% rather results in degradation in hot workability and toughness even when the REM is contained in combination with Ca and/or Mg. Therefore, the REM content is set at 0.01 to 0.074%. A preferable lower limit of the REM content is 0.015%, and a more preferable lower limit thereof is 0.019%. In addition, a preferable upper limit of the REM content is 0.06%, and a more preferable upper limit thereof is 0.058%.

In the present invention, the term "REM" refers to 17 elements in total, Sc (scandium), Y (yttrium), and Lanthanoid elements, and the term "REM content" refers to a content of a REM if the number of REMs is one, or to a total content of REMs if the number of REMs is two or more. In addition, REMs are supplied in general as a misch metal, which is a mixture of REMs. For this reason, one, two or more of individual elements may be added such that the amount of REMs falls within the above range, or for example, the elements may be added in the form of the misch metal such that the amount of REMs falls within the above range.

One or more of Ca and Mg: 0.0003 to 0.01% in total

Making an alloy containing Ca (calcium) and/or Mg (magnesium) in combination with REM stably inhibit degradation in hot workability in a low-temperature region and provides the alloy with high-strength, good toughness at a low temperature range, and the stress corrosion cracking resistance in an elevated temperature environment that includes hydrogen sulfide. The above effects are obtained by making the alloy contain 0.0003% or more of one or more of Ca and Mg in total. However, making the alloy containing more than 0.01% of one or more of Ca and Mg in total rather causes degradation of hot workability even when the one or more of Ca and Mg is contained in combination with REM. Therefore, the content of one or more of Ca and Mg is set at 0.0003 to 0, 01% in total. A preferable lower limit of the total content of one or more of Ca and Mg is 0.0005%, and a more preferable lower limit thereof is 0.0007%. In addition, a preferable upper limit of the total content of one of more of Ca and Mg is 0.005%, and a more preferable upper limit thereof is 0.0042%.

Note that it is not necessary to make the alloy containing Ca and Mg in combination. In the case of making the alloy contain only Ca, the content of Ca may be set at 0.0003 to 0.01%, and in the case of making the alloy contain only Mg, the content of Mg may be set at 0.0003 to 0.01%.

W: 0% or more and less than 8.0%

W (tungsten) functions to increase the stress corrosion cracking resistance. For this reason, W may be contained as necessary. However, the W content of 8.0% or more deteriorates hot workability and economic efficiency. Therefore, the amount of W is set at less than 8.0% when W is to be contained. The amount of W is preferably less than 7.0% when W is to be contained.

On the other hand, to stably give rise to an advantageous effect of improving the stress corrosion cracking resistance brought by W described above, the amount of W is preferably 0.1% or more when W is to be contained.

Ti, Nb, Zr, and V: 0 to 0.5% of one or more thereof in total

Ti (titanium), Nb (niobium), Zr (zirconium), and V (vanadium) all function to refine grains so as to increase strength and ductility. For this reason, Ti, Nb, Zr, and V may be contained alone or two or more thereof may be contained in combination as necessity. However, making an alloy contain more than 0.5% of one or more of the above elements in total deteriorates hot workability and generates a large number of inclusions, rather causing a phenomenon of reducing ductility. Therefore, the amount of the one or more these elements is set at 0.5% or less in total when these elements are contained. The amount of the one or more of these elements is preferably 0.3% or less in total when these elements are to be contained.

On the other hand, to stably give rise to an advantageous effect of improving strength and ductility brought by Ti, Nb, Zr, or V described above, the amount of the one or more of Ti, Nb, Zr, and V is preferably 0.01% or more in total, and more preferably 0.05% or more.

Co: 0 to 2.0%

Co (cobalt) contributes to stabilization of the austenite phase and functions to improve the stress corrosion cracking resistance at high temperatures. For this reason, Co may be contained as necessary. However, an excessive Co content leads to a rise of alloy price, significantly impairing economic efficiency. Therefore, the amount of Co with a specified upper limit is set at 2.0% or less when Co is to be contained. The amount of Co is preferably 1.0% or less when Co is to be contained.

On the other hand, to stably develop give rise to an advantageous effect of improving stress corrosion cracking resistance at high temperatures brought by Co described above, the amount of Co is preferably 0.01% or more when Co is to be contained.

A Ni—Cr alloy material according to the present invention has a chemical composition that consists of the elements described above, the balance thereof being Fe and impurities, and C, P, S, and O in the impurities are C: 0.03% or less, P: 0.03% or less, S: 0.001% or less, and O: 0.01% or less.

The term "impurities" refers to substances which are mixed in from ores as raw material, scraps, or a producing environment in producing an alloy material industrially.

C: 0.03% or less

C (carbon) is contained as an impurity, and C content more than 0.03% facilitates the stress corrosion cracking involving an intergranular fracture due to precipitation of $M_{23}C_6$ carbide ("M" refers to an element such as Cr, Mo, and/or Fe.). Therefore, the C content is set at 0.03% or less. A preferable upper limit of the C content in the impurity is 0.02%, a more preferable upper limit thereof is 0.015%, and a still more preferable upper limit thereof is 0.012%.

P: 0.03% or less

P (phosphorus) is an impurity contained in an alloy and significantly reduces hot workability and the stress corrosion cracking resistance. Therefore, the content of P is set at 0.03% or less. A preferable upper limit of the P content in the impurity is 0.025%, a more preferable upper limit thereof is 0.020%, and a still more preferable upper limit thereof is 0.019%.

S: 0.001% or less

S (sulfur) is also an impurity that significantly reduces hot workability, as with P. From the viewpoint of preventing the reduction of hot workability, it is desirable to set S content as low as possible, and thus an upper limit was specified on S content and the S content is set at 0.001% or less. A preferable upper limit of S content in the impurity is 0.0009%, a more preferable upper limit thereof is 0.0008%, and a still more preferable upper limit thereof is 0.0006%.

O (oxygen): 0.01% or less

O (oxygen) is an impurity contained in an alloy, significantly reducing hot workability. Therefore, the content of O is set at 0.01% or less. A preferable upper limit of the O content in the impurity is 0.009%, and a more preferable upper limit thereof is 0.005%.

(B) Dislocation Density

In a micro-structure of Ni—Cr alloy materials according to the present invention having chemical compositions described in the above section (A), the dislocation density thereof have to satisfy the following formula:

$$7.0 \times 10^{15} \leq \rho \leq 10^{16} - 2.67 \times 10^{17} \times [\text{REM (\%)}]$$

where, $\rho$ denotes the dislocation density expressed in $m^{-2}$, and [REM (%)] denotes the REM content by mass %.

In a Ni—Cr alloy material having the chemical composition described above, the dislocation density $\rho$ of a micro-structure less than $7.0 \times 10^{15}$ $m^2$ results in failure of obtaining a 02% yield stress of 965 MPa or more. On the other hand, the dislocation density $\rho$ of the micro-structure more than $[2.7 \times 10^{16} - 2.67 \times 10^{17} \times [\text{REM (\%)}]]$ $m^{-2}$ results in a reduction of toughness, as well as reduction of stress corrosion cracking resistance in an environment being at high temperatures more than 200° C. and including hydrogen sulfide. Therefore, it is determined that the micro-structure has a dislocation density satisfying the above formula.

Note that the dislocation density $\rho$ is preferably $2.0 \times 10^{16}$ $m^{-2}$ or less.

The Ni—Cr alloy material according to the present invention can be produced in the following manner, for example.

First, an alloy is melt using an electric furnace, an AOD furnace, or a VOD furnace to adjust a chemical composition. In a desulfurizing process using REM in combination with Ca and/or Mg, it is desirable to add REM and Ca and/or Mg, after a sufficient deoxidation with Al or the like.

A molten metal having the adjusted chemical composition is next cast into an ingot and may be afterward subjected to hot working such as forging to be worked into a so-called "alloy object" such as a slab, bloom, and billet. Alternatively, the above molten metal may be subjected to continuous casting and directly made into a so-called "alloy object" such as a slab, bloom, and billet.

Furthermore, the above "alloy object" is subjected to hot working to be formed into a desired shape such as a plate material or a tubular blank. For example, when the "alloy object" is worked into a plate material, the "alloy object" can be subjected to hot working into a plate shape or coil shape by a hot rolling. In addition, for example, when the "alloy object" is worked into a tubular blank, the "alloy object" can be subjected to hot working to be formed into a tubular shape by a hot-extrusion tube-making process or Mannesmann pipe making process.

Next, to provide the micro-structure with the dislocation density $\rho$ satisfying the above formula, in the case of a plate material, a solution treatment is performed on the hot rolled material, and cold working is thereafter performed by cold rolling. In the case of a tubular blank, a solution treatment is performed on a material pipe having been subjected to hot working, and cold working is thereafter performed by cold drawing or cold rolling such as Pilger rolling.

Depending on a chemical composition, the alloy is cold deformed for 31 to 50% in area reduction. This deformation could be at a time or divided into multiple times. Similarly, if intermediate heat treatment is performed after cold working, further cold working for 31 to 50% in area reduction depending on the chemical composition is performed at a time or multiple times to a predetermined size.

When the REM content is high, it is necessary to control the reduction of area in cold working such that the dislocation density $\rho$ does not exceed a value determined by the above formula. In addition, when the N content is high, the reduction of area in cold working should be suppressed. On the other hand, when the REM content or the N content is low, it is preferable to select a high reduction of area in cold working.

For example, to make the dislocation density $7.0 \times 10^{15}$ $m^{-2}$ or more, it is preferable to set the reduction of area in cold working described above to be 42% or more when the N content is about 0.04%. It is preferable to set the reduction of area to be 31% or more when the N content is about 0.16%. Note that the N content to make the dislocation density $7.0 \times 10^{15}$ $m^{-2}$ or more may vary with relations with contents of elements other than N.

An upper limit of the reduction of area described above in cold working depends on the REM content and the N content, but when the reduction of area (%) is substantially determined to be equal to or less than the value expressed by the formula $[\{(1.78-17.78 \times [\text{REM (\%)}])^{0.5} - 2 \times [\text{N (\%)}]\}/0.02]$ (wherein, [REM (%)] and [N (%)] refer to the contents of REM and N by mass %, respectively), it is possible to control the dislocation density $\rho$ within a range that does not exceed the value specified in the present invention. Note that an alloy material having a REM content of 0.05% or more, and N content of 0.14% or more makes the range of reduction of area allowed in cold working narrow.

Hereafter, the present invention will be described in detail by way of examples.

EXAMPLE

Alloys having chemical compositions shown in Table 1 were melted in a vacuum induction furnace and cast into 50 kg ingots.

Alloys A to I in Table 1 are alloys having chemical compositions that all within a range specified in the present invention. In contrast, alloys 1 to 13 are alloys having chemical compositions that deviate from the conditions specified in the present invention.

TABLE 1

| | Chemical composition (mass %) Balance: Fe and impurties | | | | | | | | | | |
|---|---|---|---|---|---|---|---|---|---|---|---|
| Alloy | C | Si | Mn | P | S | Cu | Ni | Cr | Mo | N | sol Al |
| A | 0.011 | 0.13 | 0.24 | 0.005 | 0.0004 | 0.7 | 50.3 | 23.6 | 5.7 | 0.099 | 0.115 |
| B | 0.012 | 0.40 | 0.53 | 0.005 | 0.0003 | 0.6 | 49.2 | 25.3 | 6.7 | 0.139 | 0.094 |
| C | 0.012 | 0.29 | 0.42 | 0.018 | 0.0003 | 0.6 | 49.3 | 25.3 | 6.1 | 0.081 | 0.135 |
| D | 0.004 | 0.15 | 0.62 | 0.001 | 0.0003 | 0.7 | 51.1 | 23.5 | 5.7 | 0.098 | 0.087 |
| E | 0.007 | 0.07 | 0.66 | 0.014 | 0.0004 | 0.7 | 51.0 | 24.7 | 6.5 | 0.103 | 0.091 |
| F | 0.011 | 0.33 | 0.37 | 0.010 | 0.0004 | 0.6 | 50.6 | 24.4 | 6.7 | 0.106 | 0.116 |
| G | 0.006 | 0.14 | 0.24 | 0.019 | 0.0003 | 0.7 | 50.3 | 25.7 | 5.7 | 0.106 | 0.072 |
| H | 0.008 | 0.14 | 0.40 | 0.014 | 0.0009 | 0.8 | 49.9 | 24.1 | 6.2 | 0.125 | 0.090 |

TABLE 1-continued

| | | | | | | | | | | |
|---|---|---|---|---|---|---|---|---|---|---|
| I | 0.007 | 0.15 | 0.40 | 0.014 | 0.0005 | 0.8 | 50.0 | 24.1 | 5.2 | 0.118 | 0.076 |
| 1 | * 0.032 | 0.19 | 0.54 | 0.001 | 0.0010 | 0.8 | 49.6 | 23.6 | 6.4 | 0.115 | 0.130 |
| 2 | 0.011 | 0.30 | 0.65 | 0.020 | 0.0002 | 0.6 | 51.2 | * 19.3 | 6.1 | 0.104 | 0.070 |
| 3 | 0.001 | 0.25 | 0.63 | 0.022 | 0.0005 | 0.8 | * 32.7 | 25.0 | 5.9 | 0.112 | 0.130 |
| 4 | 0.008 | 0.25 | 0.59 | 0.030 | 0.0010 | * 2.9 | 49.7 | 24.8 | * 2.9 | 0.087 | 0.094 |
| 5 | 0.010 | 0.20 | 0.59 | 0.006 | 0.0004 | 0.8 | 49.1 | 24.7 | 6.7 | * 0.0084 | 0.128 |
| 6 | 0.009 | 0.23 | 0.34 | 0.018 | 0.0005 | 0.7 | 49.8 | 25.0 | 6.9 | 0.107 | 0.119 |
| 7 | 0.012 | 0.12 | 0.39 | 0.020 | 0.0002 | 0.7 | 51.2 | 25.5 | 5.7 | 0.119 | 0.071 |
| 8 | 0.011 | 0.28 | 0.62 | 0.018 | 0.0008 | 0.8 | 52.1 | 25.2 | * 4.4 | 0.150 | 0.120 |
| 9 | 0.002 | 0.39 | 0.27 | 0.012 | 0.0007 | 0.1 | 48.3 | 25.2 | * 7.5 | 0.114 | 0.130 |
| 10 | 0.030 | 0.19 | 0.11 | 0.012 | 0.0010 | * 2.1 | 49.3 | 22.3 | * 1.5 | * 0.020 | * 0.220 |
| 11 | 0.030 | * 0.55 | 0.24 | 0.022 | * 0.0020 | 0.7 | 48.4 | 27.6 | 6.5 | * 0.020 | 0.120 |
| 12 | 0.006 | 0.35 | 0.33 | 0.008 | 0.0005 | 0.9 | 53.0 | 25.5 | 6.3 | 0.144 | 0.040 |
| 13 | 0.004 | 0.43 | 0.32 | 0.006 | 0.0003 | 0.2 | 53.9 | 25.3 | 6.3 | * 0.210 | 0.040 |

| | Chemical composition (mass %) Balance: Fe and impurities | | | | | | Hot |
|---|---|---|---|---|---|---|---|
| Alloy | Ca | Mg | Ca + Mg | REM | O | Others | workability |
| A | 0.0010 | — | 0.0010 | Nd: 0.035 | 0.004 | — | ○ |
| B | 0.0007 | — | 0.0007 | Nd: 0.059 | 0.003 | Zr: 0.006 | ○ |
| C | 0.0012 | — | 0.0012 | La: 0.037 | 0.004 | Co: 0.3, V: 0.02 | ○ |
| D | 0.0029 | — | 0.0029 | Nd: 0.032 | 0.001 | Co: 0.3 | ○ |
| E | 0.0042 | — | 0.0042 | Nd: 0.044 | 0.002 | Nb: 0.01 | ○ |
| F | — | 0.0010 | 0.0010 | Nd: 0.044, Ce: 0.014 | 0.005 | — | ○ |
| G | — | 0.0021 | 0.0021 | Nd: 0.024 | 0.003 | — | ○ |
| H | — | 0.0015 | 0.0015 | La: 0.019 | 0.009 | W: 2.0 | ○ |
| I | 0.0012 | 0.0010 | 0.0022 | Nd: 0.037 | 0.005 | Ti: 0.004, Co: 0.3 | ○ |
| 1 | 0.0040 | — | 0.0040 | Nd: 0.024 | 0.006 | — | ○ |
| 2 | 0.0023 | — | 0.0023 | La: 0.017 | 0.006 | — | ○ |
| 3 | 0.0008 | — | 0.0008 | Y: 0.023 | 0.004 | — | ○ |
| 4 | 0.0015 | — | 0.0015 | Nd: 0.014 | 0.004 | — | ○ |
| 5 | 0.0033 | — | 0.0033 | Nd: 0.019 | 0.001 | — | ○ |
| 6 | 0.0010 | — | 0.0010 | * — | 0.001 | — | x |
| 7 | 0.0045 | — | 0.0045 | * Nd: 0.131 | 0.001 | — | ○ |
| 8 | 0.0018 | — | 0.0018 | Nd: 0.033 | 0.004 | — | ○ |
| 9 | 0.0012 | — | 0.0012 | Nd: 0.018 | 0.002 | — | x |
| 10 | — | — | * — | * — | 0.004 | — | ○ |
| 11 | 0.0024 | — | 0.0024 | La: 0.012 | 0.003 | — | x |
| 12 | — | — | — | Nd: 0.022 | 0.003 | — | x |
| 13 | 0.0041 | — | 0.0041 | Nd: 0.041 | 0.002 | — | ○ |

The mark "○" in the hot workability column indicates that a reduction of area after tensile rupture was 60% or more at all the test temperatures in Gleeble test, meaning a good hot workability.
On the other hand, the mark "x" indicates that the reduction of area after tensile rupture fell below 60% at any one of the test temperatures.
The mark "*" indicates that the alloy has a chemical composition that deviated from the conditions specified in the present invention.

Each ingot was subjected to a soaking process at 1200° C. for 3 h and thereafter subjected to hot forging to be worked into a square bar having a cross section of 50 mm×50 mm.

The square bar obtained in such a manner was further heated at 1200° C. for 1 h and thereafter subjected to hot rolling to be made into a plate material having a thickness of 14.2 mm.

Next, from a part of the plate material described above having a thickness of 14.2 mm obtained by the hot rolling, a test specimen of which diameter and length are 10 mm and 130 mm, respectively, was taken in a direction parallel to a rolling direction of the plate material (hereafter, referred to as an "L direction"), and a hot workability of the test specimen was evaluated by Gleeble machine.

In a hot workability test, the above test specimen having been heated at 1200° C. for 3 min was cooled at a rate of 100° C./min, and was subjected to tensile rupture at time points when a temperature thereof dropped to 1100° C., 1000° C., 900° C., 800° C., and 700° C.

The evaluation was made to be good in hot workability when a reduction of area after the tensile rupture was 60% or more at all the above test temperatures. This is based on the experience that when the above reduction of area falls below 60%, a large number of surface defects and cracks developed during hot tube-making process using an alloy billet as a starting material.

The test results on the above hot workability are also shown Table 1. Note that the mark "○" in the hot workability column indicates that the reduction of area after the tensile rupture was 60% or more at all the test temperatures, meaning a good hot workability. On the other hand, the mark "x" indicates that the reduction of area after the tensile rupture fell below 60% at any one of the test temperatures.

The remaining hot rolled plate material of 14.2 mm in thickness of the alloys A to I, and 1 to 5, 7, 8, 10, and 13, which were evaluated to be good in hot workability by the Gleeble test mentioned above, was solution treated at 1100° C. for 1 h followed by water-cooling to obtain an austenite single-phase structure having an FCC crystalline structure.

Subsequently, cold rolling was performed on the plate material having been subjected to the water cooling to make three kinds of plate materials having thicknesses of 9.8 mm, 8.4 mm, and 7 mm, respectively. Note that the plate materials having thicknesses of 9.8 mm and 7 mm were not made from the alloy 10.

Next, test specimens of which size is 20 mm by 20 mm and 2 mm in thickness were cut from the center portion in thickness of the above three kinds of cold rolled materials having thicknesses of 9.8 mm, 8.4 mm, and 7 mm. Then, the surface of the test specimen was subjected to electrolytic polishing at 10° C. using 10% perchloric acid-acetic acid mixture solution as electrolyte. Dislocation density was measured using the test specimens after the electrolytic polishing.

Note that the measurement of dislocation density was performed using an evaluating method based on the Williamson-Hall method described in Non-Patent Document 2 and proposed by Nakajima et al in Non-Patent Document 1.

Specifically, to measure an X-ray diffraction profile, a Co tube was used as a cathode tube, and the profile was measured using the θ-2θ diffraction method in a range from 40° to 130° in terms of 2θ. Then, strain ε was determined from each of diffractions on {111}, {220} and {311} planes of an FCC crystalline structure using a half-value width by performing fitting using the Rietveld method, which is described in Non-Patent Document 3. Furthermore, the dislocation density ρ in $m^{-2}$ was determined by calculating the formula expressed using the above strain ε and a Burgers vector b: $\rho=14.4\varepsilon^2/b^2$ Note that, to measure a profile derived from a measurement apparatus, a material solution treated at 1100° C. followed by water cooling, which is considered to have a very low dislocation density was used for each alloy. In addition, a value used as the above Burgers vector b was $0.2545 \times 10^{-9}$ m.

Furthermore, test specimens were cut from the three kinds of cold rolled materials having thicknesses of 9.8 mm, 8.4 mm, and 7 mm obtained in the above manner, and tensile property and toughness (shock resistance property) were examined.

In the examination of tensile property, two round-bar tensile test specimens having a parallel portion of 4 mm in diameter and 34 mm in gauge length were taken from each cold rolled material. Specifically, for each cold rolled material, a test specimen having a parallel portion parallel to the above L direction, and a test specimen having a parallel portion perpendicular to the above L direction were taken. On these two test specimens, a tensile test was conducted at room temperature to determine a yield strength (0.2% yield stress). Yield strengths shown in Table 2 are each an average value of yield strengths of the two test specimens. A tensile speed in the test was set at 1.0 mm/min, which corresponds to strain rate of $4.9 \times 10^{-4}$/s. In the examination of tensile property, an alloy was determined to have a sufficiently high strength when an average value of 0.2% yield stresses of the two test specimens was 965 MPa or more. In this example, a target yield strength was set at 965 MPa.

In the examination of toughness, two sub-size V-notched Charpy impact test specimens of which width are 5 mm were taken from each cold rolled material. Specifically, for each cold rolled material, a test specimen having a longitudinal direction parallel to the above L direction, and a test specimen having a longitudinal direction perpendicular to the above L direction were taken. On these test specimens, Charpy impact test was conducted at −10° C., which can be considered to be a usage environment of oil country tubular goods. Then, a value obtained by dividing an absorbed energy by an original sectional area of the notch portion (hereafter, referred as an "impact value") was determined. Impact values shown in Table 2 are each an average value of impact values of the two test specimens. In the examination of toughness, an alloy was determined to have sufficiently high shock resistance property when an average value of the impact values of the two test specimens exceeds 63 J/cm².

Furthermore, test specimens were cut from the above three kinds of cold rolled materials having thicknesses of 9.8 mm, 8.4 mm, and 7 mm, and corrosion resistance was examined.

In the examination of stress corrosion cracking resistance, slow-strain rate tensile test specimen were taken from each cold rolled material. The slow-strain rate tensile test specimen having a parallel portion that measured 3.81 mm in diameter and 25.4 mm in length, in conformity with the slow-strain rate tensile test method specified in NACE TM0198. Specifically, from each cold rolled material, the test specimen was taken in such a manner that made the parallel portion parallel to the above L direction. Then, the slow-strain rate tensile test conforming to NACE TM0198 was conducted to evaluate corrosion resistances.

The test environment for the above slow-strain rate tensile test was specified as two conditions: in the atmosphere; and in an environment imitating a hostile oil-well environment ($H_2S$ partial pressure: 0.689 MPa (100 psi), 25% NaCl+ 0.5% $CH_3COOH$, pH: 2.8, temperature: 204° C.). In both of the environments, the strain speed in the tensile test was set at $4.0 \times 10^{-6}$/s.

Note that in the examination of corrosion resistance, specifically, four slow-strain rate tensile test specimens were taken from each cold rolled material. On one of the above four test specimens, values of fracture ductility and reduction of area at fracture were determined by the tensile test in the atmosphere (hereafter, referred to as "reference value of fracture ductility" and "reference value of reduction of area at fracture"). On the other three test specimens, values of fracture ductility and reduction of area at fracture were determined by the tensile test in the environment imitating a hostile oil-well environment (hereafter, referred to as "comparative value of fracture ductility" and "comparative value of reduction of area at fracture"). That is, in this example, for each cold rolled material, one reference value of fracture ductility, three comparative values of fracture ductility, one reference value of reduction of area at fracture, and three comparative values of reduction of area at fracture were determined.

Then, for each cold rolled material, differences between the one reference value of fracture ductility and the three comparative values of fracture ductility were determined (hereafter, each difference will be referred to as a "difference in fracture ductility"). Similarly, differences between the one reference value of reduction of area at fracture and the three comparative values of reduction of area at fracture were determined (hereafter, each difference will be referred to as a "difference in reduction of area at fracture"). In this examination, a corrosion resistance target was set as follows: all the "differences in fracture ductility" are 20% or less of the "reference value of fracture ductility"; and all the "differences in reduction of area at fracture" are 20% or less of the "reference value of reduction of area at fracture". Then, an alloy was determined to be good in corrosion resistance when the above target is reached.

Table 2 shows the results of the above examinations. For each alloy material, reference numerals 1 to 3 denotes the examination results on the cold rolled materials having thicknesses of 9.8 mm, 8.4 mm, and 7 mm. The mark "○" in the column "corrosion resistance" indicates that the alloy reached the above corrosion resistance target, and the mark "x" indicates that the alloy fell short of the corrosion resistance target.

In addition, the results shown in Table 2 are summarized in FIG. 1 that illustrates how the yield strength and the toughness vary as the REM content and the dislocation density vary. Note that FIG. 1 excludes the results on the alloy 1 to 6 and 8 to 13 because, as to the alloy 1 to 5 and 8 to 13, a content of at least one of elements other than REMs fell out of the range specified in the present invention, and as to the alloy 6, the evaluation of toughness and the like was not performed due to its deteriorated hot workability in itself. The line in the drawing is expressed as follows.

$$\rho = 2.7 \times 10^{16} - 2.67 \times 10^{17} \times [REM (\%)]$$

TABLE 2

| Alloy | Reference numeral | Value of formula [a] below | Dislocation density [ρ] ($m^{-2}$) | Yield strength (0.2% yield stress) (MPa) | Impact value at −10° C. ($J/cm^2$) | Corrosion resistance |
|---|---|---|---|---|---|---|
| A | 1 | $1.77 \times 10^{16}$ | * $5.23 \times 10^{15}$ | # 910 | 115 | o |
|   | 2 | $1.77 \times 10^{16}$ | $9.51 \times 10^{15}$ | 1017 | 95 | o |
|   | 3 | $1.77 \times 10^{16}$ | $1.28 \times 10^{16}$ | 1083 | 73 | o |
| B | 1 | $1.12 \times 10^{16}$ | * $6.76 \times 10^{15}$ | # 952 | 88 | o |
|   | 2 | $1.12 \times 10^{16}$ | $1.02 \times 10^{16}$ | 1079 | 68 | o |
|   | 3 | $1.12 \times 10^{16}$ | * $1.73 \times 10^{16}$ | 1161 | # 55 | # x |
| C | 1 | $1.71 \times 10^{16}$ | * $5.03 \times 10^{15}$ | # 904 | 115 | o |
|   | 2 | $1.71 \times 10^{16}$ | $8.97 \times 10^{15}$ | 1005 | 93 | o |
|   | 3 | $1.71 \times 10^{16}$ | $1.19 \times 10^{16}$ | 1066 | 75 | o |
| D | 1 | $1.85 \times 10^{16}$ | * $6.15 \times 10^{15}$ | # 936 | 125 | o |
|   | 2 | $1.85 \times 10^{16}$ | $1.26 \times 10^{16}$ | 1080 | 98 | o |
|   | 3 | $1.85 \times 10^{16}$ | $1.54 \times 10^{16}$ | 1129 | 75 | o |
| E | 1 | $1.53 \times 10^{16}$ | * $6.64 \times 10^{15}$ | #949 | 98 | o |
|   | 2 | $1.53 \times 10^{16}$ | $8.40 \times 10^{15}$ | 992 | 78 | o |
|   | 3 | $1.53 \times 10^{16}$ | * $1.78 \times 10^{16}$ | 1094 | # 52 | # x |
| F | 1 | $2.22 \times 10^{16}$ | * $5.47 \times 10^{16}$ | # 917 | 158 | o |
|   | 2 | $2.22 \times 10^{16}$ | $9.88 \times 10^{15}$ | 1025 | 153 | o |
|   | 3 | $2.22 \times 10^{16}$ | $1.40 \times 10^{16}$ | 1105 | 103 | o |
| G | 1 | $2.06 \times 10^{16}$ | * $4.63 \times 10^{16}$ | # 892 | 193 | o |
|   | 2 | $2.06 \times 10^{16}$ | $9.65 \times 10^{15}$ | 1020 | 163 | o |
|   | 3 | $2.06 \times 10^{16}$ | $1.31 \times 10^{16}$ | 1088 | 140 | o |
| H | 1 | $2.19 \times 10^{16}$ | $8.01 \times 10^{15}$ | 983 | 128 | o |
|   | 2 | $2.19 \times 10^{16}$ | $1.25 \times 10^{16}$ | 1078 | 95 | o |
|   | 3 | $2.19 \times 10^{16}$ | $1.54 \times 10^{16}$ | 1129 | 83 | o |
| I | 1 | $1.71 \times 10^{16}$ | $8.06 \times 10^{15}$ | 984 | 108 | o |
|   | 2 | $1.71 \times 10^{16}$ | $1.20 \times 10^{16}$ | 1068 | 88 | o |
|   | 3 | $1.71 \times 10^{16}$ | $1.48 \times 10^{16}$ | 1119 | 75 | o |
| *1 | 1 | $2.06 \times 10^{16}$ | * $5.00 \times 10^{15}$ | # 903 | 102 | # x |
|   | 2 | $2.06 \times 10^{16}$ | $1.01 \times 10^{16}$ | 1030 | 78 | # x |
|   | 3 | $2.06 \times 10^{16}$ | $1.30 \times 10^{16}$ | 1087 | 64 | # x |
| *2 | 1 | $2.25 \times 10^{16}$ | $7.06 \times 10^{15}$ | # 960 | 115 | # x |
|   | 2 | $2.25 \times 10^{16}$ | $9.79 \times 10^{15}$ | 1023 | 87 | # x |
|   | 3 | $2.25 \times 10^{16}$ | $1.49 \times 10^{16}$ | 1122 | 72 | # x |
| *3 | 1 | $2.09 \times 10^{16}$ | * $5.24 \times 10^{15}$ | # 910 | 108 | # x |
|   | 2 | $2.09 \times 10^{16}$ | $7.74 \times 10^{15}$ | 976 | 81 | # x |
|   | 3 | $2.09 \times 10^{16}$ | $1.35 \times 10^{16}$ | 1096 | 69 | # x |
| *4 | 1 | $2.33 \times 10^{16}$ | * $4.87 \times 10^{15}$ | # 899 | 153 | # x |
|   | 2 | $2.33 \times 10^{16}$ | * $6.54 \times 10^{15}$ | # 946 | 118 | # x |
|   | 3 | $2.33 \times 10^{16}$ | $1.41 \times 10^{16}$ | 1107 | 100 | # x |
| *5 | 1 | $2.19 \times 10^{16}$ | * $3.52 \times 10^{15}$ | # 818 | 153 | o |
|   | 2 | $2.19 \times 10^{16}$ | * $6.57 \times 10^{15}$ | # 949 | 118 | o |
|   | 3 | $2.19 \times 10^{16}$ | $9.47 \times 10^{15}$ | 989 | 100 | # x |
| *7 | 1 | $-7.98 \times 10^{15}$ | $6.04 \times 10^{15}$ | # 916 | # 52 | o |
|   | 2 | $-7.98 \times 10^{15}$ | * $9.84 \times 10^{15}$ | 1002 | # 42 | o |
|   | 3 | $-7.98 \times 10^{15}$ | * $1.44 \times 10^{16}$ | 1068 | # 38 | # x |
| *8 | 1 | $1.82 \times 10^{16}$ | * $5.67 \times 10^{15}$ | # 950 | 113 | # x |
|   | 2 | $1.82 \times 10^{16}$ | $9.28 \times 10^{15}$ | 1048 | 88 | # x |
|   | 3 | $1.82 \times 10^{16}$ | $1.24 \times 10^{16}$ | 1098 | 72 | # x |
| *10 | 2 | $2.70 \times 10^{16}$ | $7.42 \times 10^{15}$ | # 948 | 180 | # x |
| *13 | 1 | $1.61 \times 10^{16}$ | * $5.66 \times 10^{15}$ | # 931 | 81 | o |
|   | 2 | $1.61 \times 10^{16}$ | $8.93 \times 10^{15}$ | 1079 | # 62 | o |
|   | 3 | $1.61 \times 10^{16}$ | $1.18 \times 10^{16}$ | 1107 | # 50 | o |

Formula [a] : $2.7 \times 10^{16} - 2.67 \times 10^{17} \times [REM (\%)]$
The mark "*" indicates that the alloy has chemical composition that deviated from the conditions specified in the present invention.
The mark "#" indicates that the alloy fell short of the target.

It is evident from Table 2 that alloy materials satisfying the conditions specified in the present invention are excellent in hot workability and in toughness (shock resistance property) at −10° C. It is further evident that, even with a high-strength, a yield strength (0.2% yield stress) of 965 MPa or more, the alloy materials satisfying the conditions specified in the present invention are excellent in corrosion resistance (in particular, stress corrosion cracking resistance in an environment being at high temperatures more than 200° C. and including hydrogen sulfide).

INDUSTRIAL APPLICABILITY

The Ni—Cr alloy material according to the present invention is excellent in hot workability and toughness (shock resistance property), and in corrosion resistance (in particular, stress corrosion cracking resistance in an environment being at high temperatures more than 200° C. and including hydrogen sulfide) even with a high-strength, a yield strength (0.2% yield stress) of 965 MPa or more. For this reason, the Ni—Cr alloy material according to the present invention is suitable as a starting material for high-strength seamless oil country tubular goods.

The invention claimed is:

1. A Ni—Cr alloy material having a chemical composition that consists of, by mass %:

Si: 0.01 to 0.5%, Mn: 0.01% or more and less than 1.0%, Cu: 0.01% or more and less than 1.0%, Ni: 48% or more and less than 55%, Cr: 22 to 28%, Mo: 5.6% or more and less than 7.0%, N: 0.04 to 0.16%, sol.Al: 0.03 to 0.20%, REM: 0.01 to 0.074%, W: 0% or more and less than 8.0%, Co: 0 to 2.0%, one or more of Ca and Mg: 0.0003 to 0.01% in total, and one or more of Ti, Nb, Zr, and V: 0 to 0.5% in total; and the balance being Fe and impurities, a yield strength of 965 MPa or more, and a Charpy impact value at $-10°$ C. of 68 J/cm$^2$ or more, wherein C, P, S, and O in the impurities are C: 0.03% or less, P: 0.03% or less, S: 0.001% or less, and O: 0.01% or less, and furthermore the dislocation density satisfies a following formula:

$$7.0 \times 10^{15} \leq \rho \leq 10^{16} - 2.67 \times 10^{17} \times [\text{REM (\%)}]$$

where $\rho$ denotes dislocation density expressed in m$^{-2}$, and [REM (%)] denotes REM content expressed by mass %.

2. Seamless oil country tubular goods comprising the Ni—Cr alloy material according to claim 1.

3. The Ni—Cr alloy material according to claim 1, containing 0.1% or more and less than 8.0% of W, by mass %.

4. Seamless oil country tubular goods comprising the Ni—Cr alloy material according to claim 3.

5. The Ni—Cr alloy material according to claim 3, containing 0.01 to 2.0% of Co, by mass %.

6. Seamless oil country tubular goods comprising the Ni—Cr alloy material according to claim 5.

7. The Ni—Cr alloy material according to claim 3, containing 0.01 to 0.5% of one or more of Ti, Nb, Zr, and V in total, by mass %.

8. Seamless oil country tubular goods comprising the Ni—Cr alloy material according to claim 7.

9. The Ni—Cr alloy material according to claim 7, containing 0.01 to 2.0% of Co, by mass %.

10. Seamless oil country tubular goods comprising the Ni—Cr alloy material according to claim 9.

11. The Ni—Cr alloy material according to claim 1, containing 0.01 to 0.5% of one or more of Ti, Nb, Zr, and V in total, by mass %.

12. Seamless oil country tubular goods comprising the Ni—Cr alloy material according to claim 11.

13. The Ni—Cr alloy material according to claim 11, containing 0.01 to 2.0% of Co, by mass %.

14. Seamless oil country tubular goods comprising the Ni—Cr alloy material according to claim 13.

15. The Ni—Cr alloy material according to claim 1, containing 0.01 to 2.0% of Co, by mass %.

16. Seamless oil country tubular goods comprising the Ni—Cr alloy material according to claim 15.

* * * * *

UNITED STATES PATENT AND TRADEMARK OFFICE
CERTIFICATE OF CORRECTION

PATENT NO. : 10,557,574 B2
APPLICATION NO. : 15/033930
DATED : February 11, 2020
INVENTOR(S) : Tomio et al.

Page 1 of 1

It is certified that error appears in the above-identified patent and that said Letters Patent is hereby corrected as shown below:

On the Title Page

In the Abstract:
Each of the six instances of the "£" symbol, should read "≤"

In the Specification

Column 11, Line 12:
$7.0 \times 10^{15} \leq \rho \leq 10^{16} - 2.67 \times 10^{17} \times [REM\ (\%)]$
Should read:
"$7.0 \times 10^{15} \leq \rho \leq 2.7 \times 10^{16} - 2.67 \times 10^{17} \times [REM(\%)]$"

In the Claims

Column 19, Line 23:
$7.0 \times 10^{15} \leq \rho \leq 10^{16} - 2.67 \times 10^{17} \times [REM\ (\%)]$
Should read:
"$7.0 \times 10^{15} \leq \rho \leq 2.7 \times 10^{16} - 2.67 \times 10^{17} \times [REM(\%)]$"

Signed and Sealed this
Fourth Day of August, 2020

Andrei Iancu
*Director of the United States Patent and Trademark Office*